Patented Feb. 21, 1928.

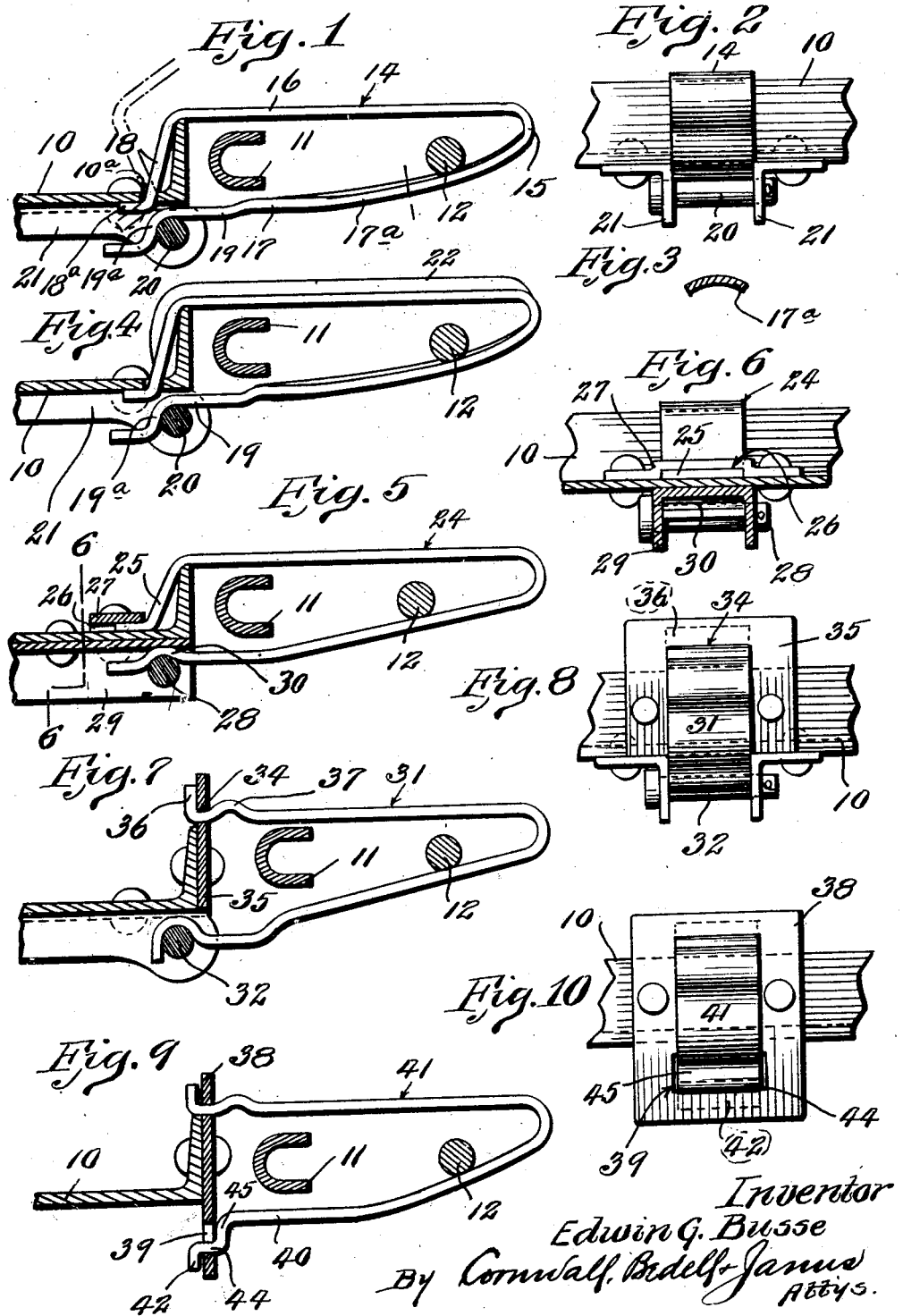

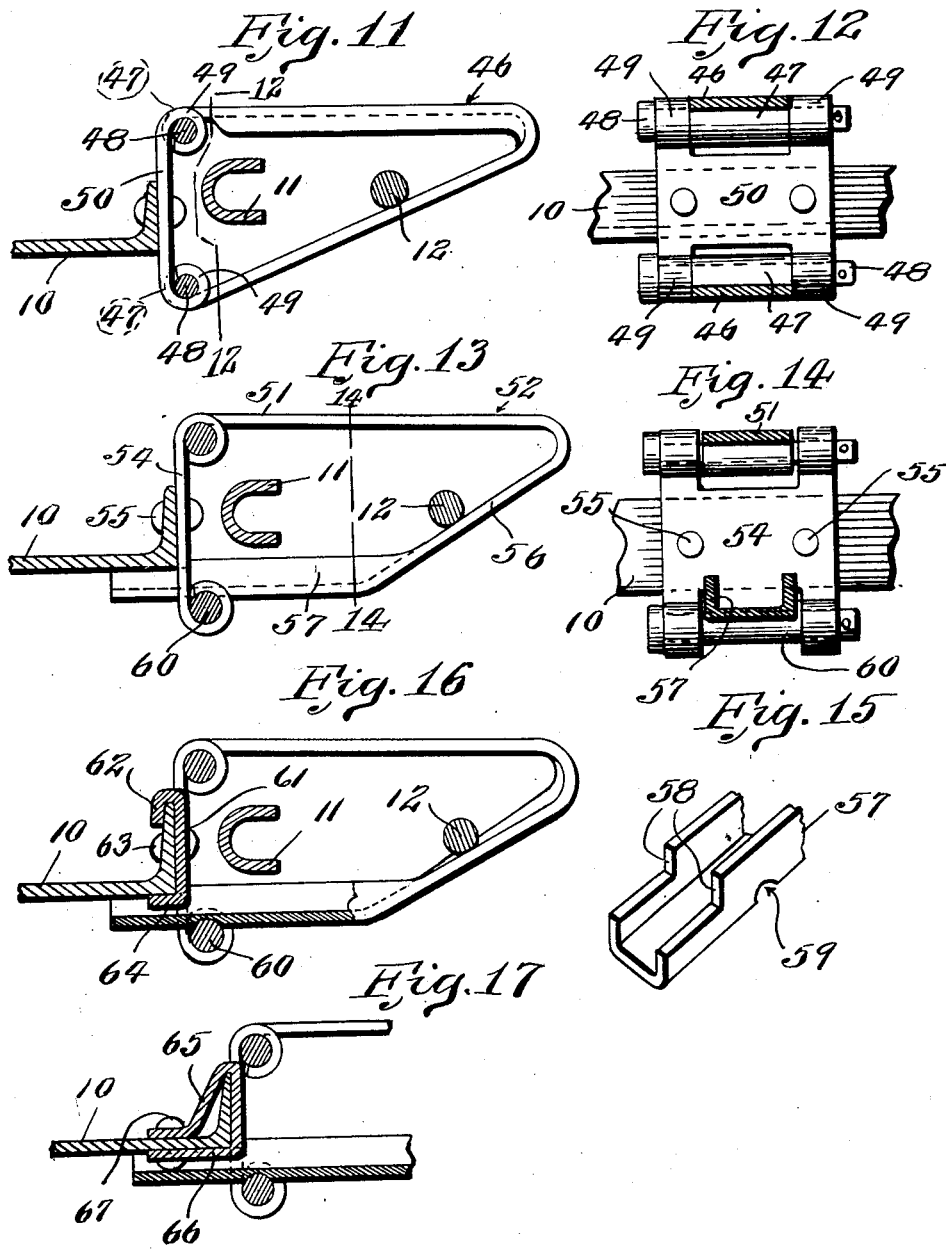

1,659,853

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

LOOP SUPPORT FOR BRAKE BEAMS.

Application filed October 11, 1924. Serial No. 743,132.

My invention relates to new and useful improvements in fourth point supports for brake beams and the objects of the invention are to provide a support formed of one piece, which support can be readily attached to and detached from the car truck part, thereby providing easy access to the brake beam and which support is either flexible or rigid or comprises a rigid portion and a flexible portion.

Further objects of the invention are to provide a supporting device in the form of a loop which encircles the brake beam and has its ends adapted to be seated in a car truck part, and to provide simple and efficient means for detachably securing the ends of said device to said car truck part.

With these and other objects in view, my invention consists in certain novel features of construction and arrangement of parts, hereinafter more fully described and claimed, and illustrated in the accompanying drawings, in which—

Figure 1 is a side elevational view of the support showing the brake beam and the spring plank in cross section.

Figure 2 is an end elevational view of the support.

Figure 3 is a transverse cross section taken on line 3—3 of Figure 1.

Figure 4 is a side elevational view of a modified form of support in which the upper portion of said support is formed rigid.

Figure 5 is a side elevational view of another modified form of support.

Figure 6 is a vertical cross section taken on line 6—6 of Figure 5.

Figure 7 is a side elevational view of a further modified form of support.

Figure 8 is an end elevational view of same.

Figure 9 is a side elevational view of a still further modified form.

Figure 10 is an end elevational view of same.

Figure 11 is a side elevational view of a support showing modified means for attaching the ends thereof to the car truck part.

Figure 12 is a vertical cross section taken on line 12—12 of Figure 11.

Figure 13 shows another form of securing the ends of the support to the car truck part.

Figure 14 is a vertical cross section taken on lines 14—14 of Figure 13.

Figure 15 is a perspective detail view of the lower end of the support.

Figures 16 and 17 are modified forms showing another form of attachment of the support to the car truck.

The present invention comprises a brake beam engaging and supporting member which is looped or rebent so as to encircle the beam. The track or beam engaging portion is inclined and is preferably formed resilient in order to permit a certain degree of play of the beam during the operating movements thereof. That portion of the track which extends under the rear end of the beam and serves to catch and support said end in case the brake beam hangers fail, may be formed either resilient or rigid as desired.

Referring by numerals to the accompanying drawings, 10 designates a part of a car truck, such as a spring plank, 11 is a compression member or rear end of the brake beam and 12 indicates the tension member or forward end of said brake beam. A single piece support 14 consisting of a bar bent at 15 to form an upper portion 16 disposed above the beam and a lower or track portion 17 extending under the beam completely encircles said beam and has its ends detachably secured to the spring plank 10. Portion 17 has an upwardly inclined portion 17$^a$ which is resilient and forms a track for the tension member 12. This track is preferably convex or curved upwardly in cross section, thereby permitting the use of the support on either side of the center of the beam. The end 18 of upper portion 16 is bent downwardly over the flange of spring plank 10 and the extremity of said end is extended through an aperture 10$^a$ formed in the web of said spring plank and is then bent horizontally as indicated at 18$^a$ so as to lie against the underside of said web portion. The other end 19 of the support extends under the spring plank and is then depressed to form a shoulder 19$^a$ which partially embraces the pin 20 and prevents the withdrawal of said end from its position.

Pin 20 is removably mounted in brackets 21 which are secured to the underside of the spring plank. The support is preferably formed resilient and the ends thereof have to be forcibly brought toward each other in order to insert them in position on the spring plank and are thus held under tension to their seats, thereby preventing accidentally unseating of said ends and eliminating loose play and noises incidental thereto.

To remove the support, pin 20 is withdrawn from brackets 21, thereby releasing end 19 so that the whole support may be tilted in a position indicated in dotted lines in Figure 1, whereby the opposite end of said support may be disengaged from spring plank 10.

In Figure 4 a modified form is shown wherein the support has its upper portion 22 formed rigid instead of resilient as in the preceding form.

Figures 5 and 6 disclose another modified form in which a support 24 has the upper end 25 inserted in a seat 26 formed by fastening a strap 27 to the upper face of the spring plank. The opposite or lower end of the support is held in position by a pin 28 removably seated in a bracket 29 and engages a seat 30 formed in said end of the support. Bracket 29 is secured to the underside of the spring plank.

Figures 7 and 8 show another modified form in which a support 31 has its lower end held in position by a removable pin 32 while the upper end of said support is seated in an aperture 34 formed in a vertical plate 35 which is fixed to the flange of the spring plank. This upper end has its extreme portion which traverses said aperture turned upwardly as indicated at 36 to prevent the withdrawal thereof from plate 35, and said end is provided on the opposite side of the plate with a hump or bend 37 which prevents the movement of the support in opposite directions.

To remove the support, pin 32 is first withdrawn from the bracket, whereupon said support may be tilted with the aperture 34 as the pivot until end 36 is in a position to be withdrawn from plate 35.

The form shown in Figures 9 and 10 is similar to the form just described, except that a plate 38 which is secured to the flange of the spring plank extends below the same and is provided with an elongated aperture 39 for receiving the lower end 40 of a support 41. This lower end has its extremity 42, which passes through the aperture 39, extending downwardly and engaging the inner side of said plate, thereby locking the support against movement in one direction. A horizontally disposed portion 44 unites the extreme portion 42 with an upwardly directed portion 45 which is of greater height than the length of the slot, thereby limiting the extent of movement of said support in the opposite direction. The support is formed resilient and is seated in position under tension so as to prevent rattling and displacement thereof.

In Figures 11 and 12 a support 46 is shown having its ends terminating in tubular portions 47 adapted to receive pins 48 carried by bearings 49 which are formed on the bifurcated ends of a plate 50, the latter being secured to the flange of the spring plank. The upper portion 46ª of support 46 is preferably formed rigid, being of channel construction.

In forms shown in Figures 13 to 15, inclusive, the upper portion 51 of support 52 is flexible, and the end thereof is secured to a plate 54 which is fixed to the flange of the spring plank by rivets or other suitable fastening devices 55. The lower half of the support consists of a flexible portion 56, which is inclined upwardly and forms a track for the tension member, and of a rigid portion 57 which is horizontally disposed, extending under the compression member of the beam and is of rigid construction, being preferably channel-shaped in cross section. The extreme end of this channel portion is cut away as shown in Figure 15 to provide shoulders 58 which rest against the plate 54 and limit the inward movement thereof. The underside of the channel is provided with a transversely disposed groove 59 which, when the support is in position, is engaged by a pin 60 removably seated in the lower bifurcated end of plate 61. This pin serves to positively lock the channel bar in position.

The form shown in Figure 16 is of similar construction, with the exception of the mode of attachment of plate 61 to the spring plank. In this form, portions of the ends of the plate are bent over the flange of the spring plank and under the web portion thereof as indicated at 62 and 64 and the plate may be further secured in position by means of rivets 63.

In the form shown in Figure 17, portions 65 and 66 of the upper and lower ends of the plate are bent to lie against the web portion of the spring plank and are secured thereto by a rivet 67.

I claim:

1. A resilient loop support for brake beams adapted to encircle said beam and having its ends adapted to be detachably secured under tension to a part of a car truck.

2. A resilient single piece loop support for brake beams adapted to be stressed so as to have its ends detachably secured under tension to a part of a car truck.

3. A single piece loop support for brake beams adapted to encircle a brake beam and provided with a resilient track portion for engaging a part of said brake beam and having its ends adapted to be detachably secured under tension to a car truck part.

4. A support for brake beams comprising a single piece resilient bar bent upon itself to form spaced portions disposed above and below said brake beam and having its ends adapted to detachably engage a part of a car truck.

5. A support for brake beams comprising a single piece resilient bar bent upon itself to form spaced portions disposed above and below said brake beam and having its ends adapted to be held under tension in seats carried by a car truck part.

6. In a car truck construction, the combination with a car truck part, of means secured thereto, and a single piece loop support encircling the brake beam and having its ends adapted to detachably engage said means.

7. In a car truck construction, the combination of a car truck part, a mounting on said truck part, a single piece loop support encircling a brake beam and having one end adapted to be detachably seated in fixed relation with said truck part, and a member removably carried by said mounting for engaging the other end of said support.

8. In a car construction, the combination of a car truck part, a mounting on said truck part, a single piece resilient loop support encircling a brake beam and having one end pivotally seated in fixed relation with said truck part, and a member removably carried by said mounting for engaging and tensioning the other end of said support.

9. In a car construction, the combination of a car truck part, a mounting carried by said truck part, a single piece resilient loop support encircling a brake beam and adapted to have its ends seated under tension in said mounting.

10. A supplemental support for brake beams comprising a mounting adapted to be fixed to a car truck part, a single piece support adapted to encircle a brake beam, and means for detachably engaging under tension the ends of said support to said mounting.

11. A support for brake beams comprising a single piece resilient bar bent upon itself to form spaced portions disposed above and below said brake beam and having its ends adapted to engage a truck part while said portions are stressed, whereby said support is held against displacement by its own resiliency.

12. A resilient loop support for brake beams having spaced portions adapted to be disposed above and below said brake beam and having its ends adapted to engage seats carried by a car truck part, said support being adapted to be stressed whereby the ends thereof are held to their seats by the resiliency of said support.

13. A third or fourth point loop support for brake beams comprising a resilient bar bent upon itself to encircle the brake beam and having its ends adapted to be held to their seats by the resiliency of said loop support.

14. A third or fourth point support for brake beams comprising a single piece resilient bar bent upon itself to provide portions disposed above and below said brake beam and having its ends adapted to engage seats carried by a car truck part, said bar being adapted to be stressed when placed in position, whereby the ends thereof are held against displacement by the resiliency of said bar.

In testimony whereof I hereunto affix my signature this 6th day of October, 1924.

EDWIN G. BUSSE.